(12) United States Patent
Alapuranen et al.

(10) Patent No.: US 7,382,804 B2
(45) Date of Patent: Jun. 3, 2008

(54) BANDWIDTH EFFICIENT SYSTEM AND METHOD FOR RANGING NODES IN A WIRELESS COMMUNICATION NETWORK

(75) Inventors: Pertti O. Alapuranen, Deltona, FL (US); John M. Belcea, West Melbourne, FL (US); Eduardo Lorenzo-Luaces, Lake Mary, FL (US)

(73) Assignee: MeshNetworks, Inc., Maitland, FL (US)

( * ) Notice: Subject to any disclaimer, the term of this patent is extended or adjusted under 35 U.S.C. 154(b) by 370 days.

(21) Appl. No.: 11/197,950

(22) Filed: Aug. 5, 2005

(65) Prior Publication Data

US 2006/0029009 A1    Feb. 9, 2006

Related U.S. Application Data

(60) Provisional application No. 60/598,828, filed on Aug. 5, 2004.

(51) Int. Cl.
*H04J 3/06* (2006.01)

(52) U.S. Cl. ............... 370/509; 370/503; 370/350; 455/500; 455/502; 455/456.1; 455/456.6; 455/457

(58) Field of Classification Search ............. 370/503, 370/508, 509, 519, 252, 350, 253, 236, 249; 455/456.1–6, 445, 457, 500, 502, 507, 513, 455/517–519

See application file for complete search history.

(56) References Cited

U.S. PATENT DOCUMENTS

| | | | |
|---|---|---|---|
| 3,934,251 A | 1/1976 | Spratt | |
| 3,943,509 A | 3/1976 | Pudsey | |
| 4,161,730 A | 7/1979 | Anderson | |
| 4,161,734 A | 7/1979 | Anderson | |
| 4,357,609 A | 11/1982 | Spencer | |
| 5,321,668 A | 6/1994 | Rouquette | |
| 6,137,441 A | 10/2000 | Dai et al. | |
| 6,208,297 B1 | 3/2001 | Fattouche et al. | |
| 6,266,014 B1 | 7/2001 | Fattouche et al. | |
| 6,453,168 B1 | 9/2002 | McCrady et al. | |
| 6,728,545 B1 | 4/2004 | Belcea | |
| 6,807,165 B2 | 10/2004 | Belcea | |
| 6,873,839 B2 | 3/2005 | Stanforth | |
| 6,904,021 B2 | 6/2005 | Belcea | |
| 7,042,867 B2 * | 5/2006 | Whitehill et al. | ............ 370/338 |
| 7,085,576 B2 * | 8/2006 | Ranganathan | ............ 455/456.1 |
| 7,126,951 B2 * | 10/2006 | Belcea et al. | ............ 370/400 |
| 7,142,524 B2 * | 11/2006 | Stanforth et al. | ............ 370/328 |

(Continued)

*Primary Examiner*—Tuan Tran
(74) *Attorney, Agent, or Firm*—Randi L. Karpinia; Joseph J. Buczynski

(57) ABSTRACT

The present invention provides a bandwidth efficient system and method of measuring the range between nodes (102, 106, 107) in a wireless communications network (100) with one-way data transfer, where each node (102, 106, 107) periodically transmits a message that contains information regarding neighboring nodes (102, 106, 107) from which any prior messages have been received by the transmitting node (102, 106, 107). A node (102, 106, 107) receives the messages transmitted from neighboring nodes (102, 106, 107) in the network (100), and records the times of arrival of the received messages. The node (102, 106, 107) receiving those messages can thus determine the respective distances between itself and the neighboring nodes (102, 106, 107) based on the respective time of arrivals of the received messages and the respective information included in the respective messages.

21 Claims, 3 Drawing Sheets

U.S. PATENT DOCUMENTS

| | | | |
|---|---|---|---|
| 7,221,686 B1* | 5/2007 | Belcea | 370/509 |
| 2002/0058502 A1 | 5/2002 | Stanforth | |
| 2003/0189906 A1 | 10/2003 | Belcea | |
| 2003/0227895 A1 | 12/2003 | Strutt | |
| 2004/0246975 A1 | 12/2004 | Joshi | |
| 2006/0014547 A1* | 1/2006 | Walter | 455/456.1 |
| 2006/0029010 A1 | 2/2006 | Belcea | |

* cited by examiner

BANDWIDTH EFFICIENT SYSTEM AND METHOD FOR RANGING NODES IN A WIRELESS COMMUNICATION NETWORK

This application claims the benefit of U.S. Provisional Application No. 60/598,828, filed Aug. 5, 2004, the entire content being incorporated herein by reference.

CROSS-REFERENCE TO RELATED APPLICATION

Related subject matter is described in copending U.S. Patent Application of John M. Belcea entitled "Autonomous Reference System and Method for Monitoring the Location and Movement of Objects", United States Publication No. 2006,0029010, filed concurrently herewith and incorporated herein by reference.

FIELD OF THE INVENTION

The present invention relates to a bandwidth efficient system and method for measuring the distance between nodes in a wireless network, in particular, a wireless network of unsynchronized nodes with one-way data transfer, and for computing the relative and the absolute location of the wireless nodes using the measured distances. More particularly, the present invention relates to a bandwidth efficient system and method for ranging nodes in any wireless network, such as a multihopping ad-hoc network, using radio communications and measuring the time of arrival (TOA) of data packets at the nodes, and further computing the geographic coordinates of fixed reference nodes.

BACKGROUND

In recent years, a type of mobile communications network known as an "ad-hoc multi-hopping" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access fixed networks and thus communicate with fixed nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807, 165 entitled "Time Division Protocol for an Ad-Hoc, Peer-to-Peer Radio Network Having Coordinating Channel Access to Shared Parallel Data Channels with Separate Reservation Channel", and in U.S. Pat. No. 6,873,839 entitled "Prioritized-Routing for an Ad-Hoc, Peer-to-Peer, Mobile Radio Access System", the entire content of each being incorporated herein by reference.

As can be appreciated by one skilled in the art, the time of flight (TOF) is the time interval during which a radio signal travels from one wireless terminal to another wireless terminal. Multiplying the TOF with the speed of radio wave propagation provides the distance or "range" between the two terminals. The range itself is used in several applications. Since the range provides only a measurement of proximity, one range alone is very seldom used in applications. For computing the position of a mobile node, most of the applications use either a set of ranges between several terminals, or one range and additional information about the direction.

As known in the art, the TOF is computed using two-way or one-way ranging. In two-way ranging, the station that needs the range transmits a request for range evaluation to a reference station. The reference station answers the request instantly or after a known delay. The time between transmitting the request and receiving the response at the first station is two times the TOF since in two-way ranging, the station seeking the range initiates the dialog.

In one-way ranging, clock synchronization of all references (i.e., terminals or nodes) is required all the time. If the clock of a mobile terminal involved in the ranging also is synchronized with the references, the measured ranges are true, otherwise they are all affected by the same unknown error and are called pseudo-ranges. Although one-way ranging is a more bandwidth efficient method than two-way ranging, the process of synchronizing references does require two-way exchange of messages, thereby consuming bandwidth.

For computing the position of a wireless mobile terminal in a wireless network of n fixed references with the two-way ranging method, 2n ranging messages are transmitted, while with one-way ranging, only n+1 messages are transmitted, and from time to time, another 2n messages are transmitted for maintaining the synchronization between the clocks of the terminals.

A common example of one-way ranging is the operations performed by a global positioning system (GPS). That is, GPS is based on a method that uses a one-way ranging method. All GPS satellites have high precision synchronized clocks and geocentric ephemeredes. The mobile receives simultaneously signals from several satellites located above the horizon and computes its geocentric position. Although it is very simple and direct, the method can be used only in places where several satellites can be seen simultaneously. Very accurate precision of location can be achieved only with very sophisticated GPS equipment that remains immobile for some long time and can receive signals from a large number satellites. On narrow streets with tall buildings, inside buildings or underground, the method cannot be used because the number of received signals from satellites is not satisfactory.

Also, to comply with E911 requirements, several methods for locating wireless telephones have been developed. Because all Base Stations providing connectivity to mobile telephones can have clocks synchronized to GPS satellites with $10^{-11}$ second precision, the time difference of arrival (TDOA) became the most preferred method. According to the TDOA method, when the mobile transmits a signal, at least three synchronized base stations receive the signal and record the time of arrival (TOA) of the signal. Then these base stations transmit the TOA of the mobile signal to a central computing unit usually through a wired connection. The computing unit, which knows the geocentric position of each base station, computes the geocentric position of the mobile using the TDOA of signals by solving the intersection of hyperbolas. The main advantage of the method is that no change has to be made to the mobile telephone for enabling the operation. The drawback of the method consists in potentially limited propagation of the signal between the mobile phone to at least three base stations when the mobile is located on narrow streets with tall buildings, inside large buildings or underground.

The following documents, which are incorporated by reference herein, describe different types of one-way and two-way ranging system: U.S. Pat. Nos. 6,728,545, 6,453,168, 6,266,014, 6,208,297, 5,321,668, 4,357,609, 4,161,734, 4,161,730, 3,943,509 and 3,934,251. However, none of the techniques described in these patent employ unsynchronized terminal clocks for performing one-way ranging of terminals.

Accordingly, a need exists for an efficient system and method for performing one-way ranging of terminals in a wireless communications network, to avoid the use of high quality oscillators to achieve clock synchronization between terminals.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
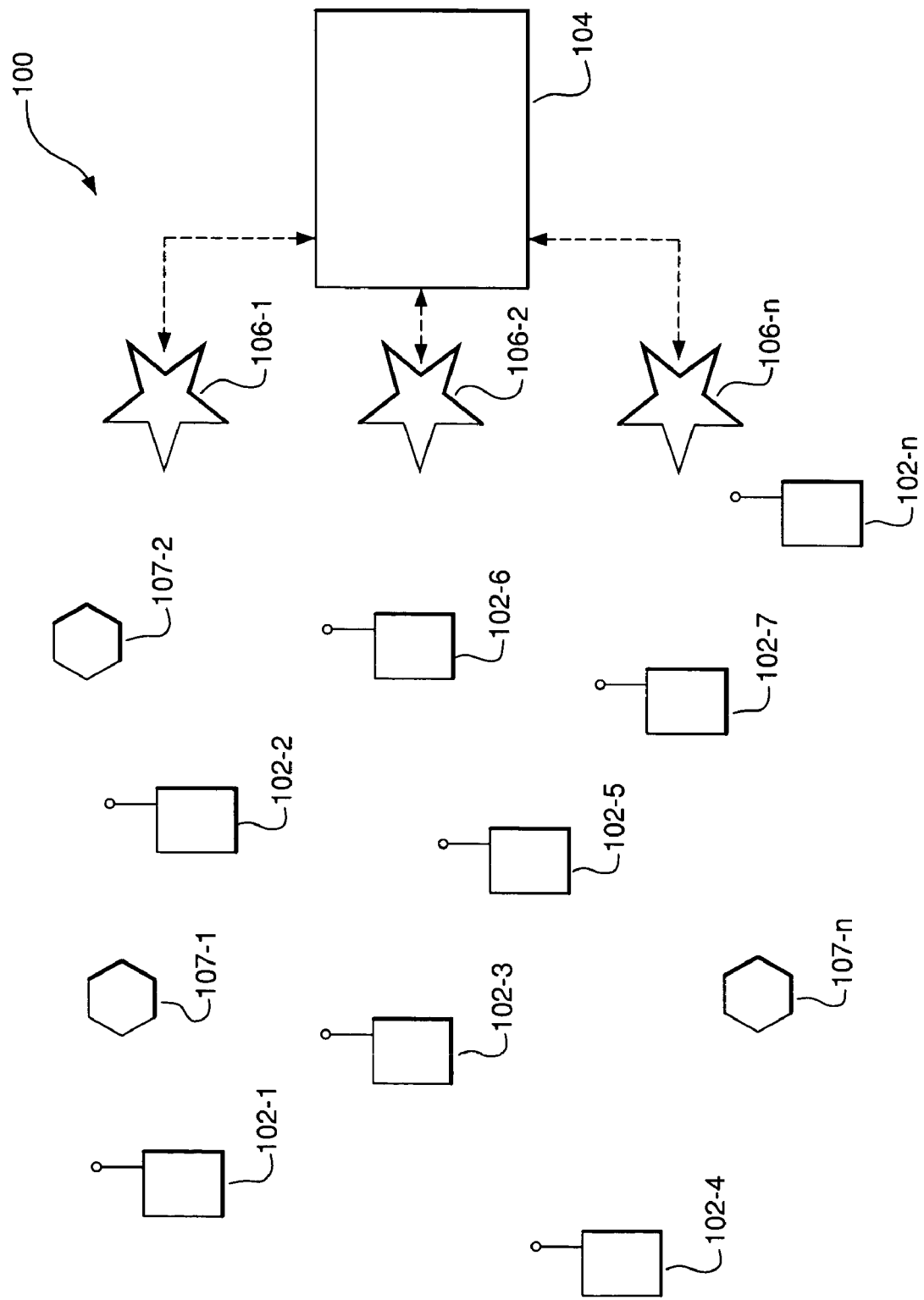
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a bandwidth efficient system and method for measuring the distance between terminals in a wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a bandwidth efficient system and method for measuring the distance between terminals in a wireless network described herein. The non-processor circuits may include, but are not limited to, a radio receiver, a radio transmitter, signal drivers, clock circuits, power source circuits, and user input devices. As such, these functions may be interpreted as steps of a method to perform a bandwidth efficient technique for measuring the distance between terminals in a wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As described in more detail below, the present invention provides an efficient system and method for ranging nodes in a wireless communications network, such as a multihopping ad-hoc peer-to-peer network. The network comprises a plurality of mobile wireless nodes, with each node periodically transmitting a respective digital message that contains information regarding its respective neighboring nodes from which any prior digital messages have been received. The nodes also receive digital messages from other nodes in the network. The information regarding neighboring nodes from which prior digital messages have been received includes the times of arrival of those messages and the positions of the neighboring nodes transmitting the messages at the time when these messages were transmitted, if such positions are known. The information in these messages is used by a node receiving the messages to range the nodes from which the node received the messages.

As can be appreciated from the above, the system and method thus measures the range between nodes in a wireless communications network using one-way data transfer between nodes. Using this technique, only n messages need to be transmitted to compute $n^2$ ranges in the network, with no restriction regarding the mobility of any node in the network.

Turning now to the figures, FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-$n$ (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes" or "terminals".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165 and 6,873,839 referenced above.

Figure 2:
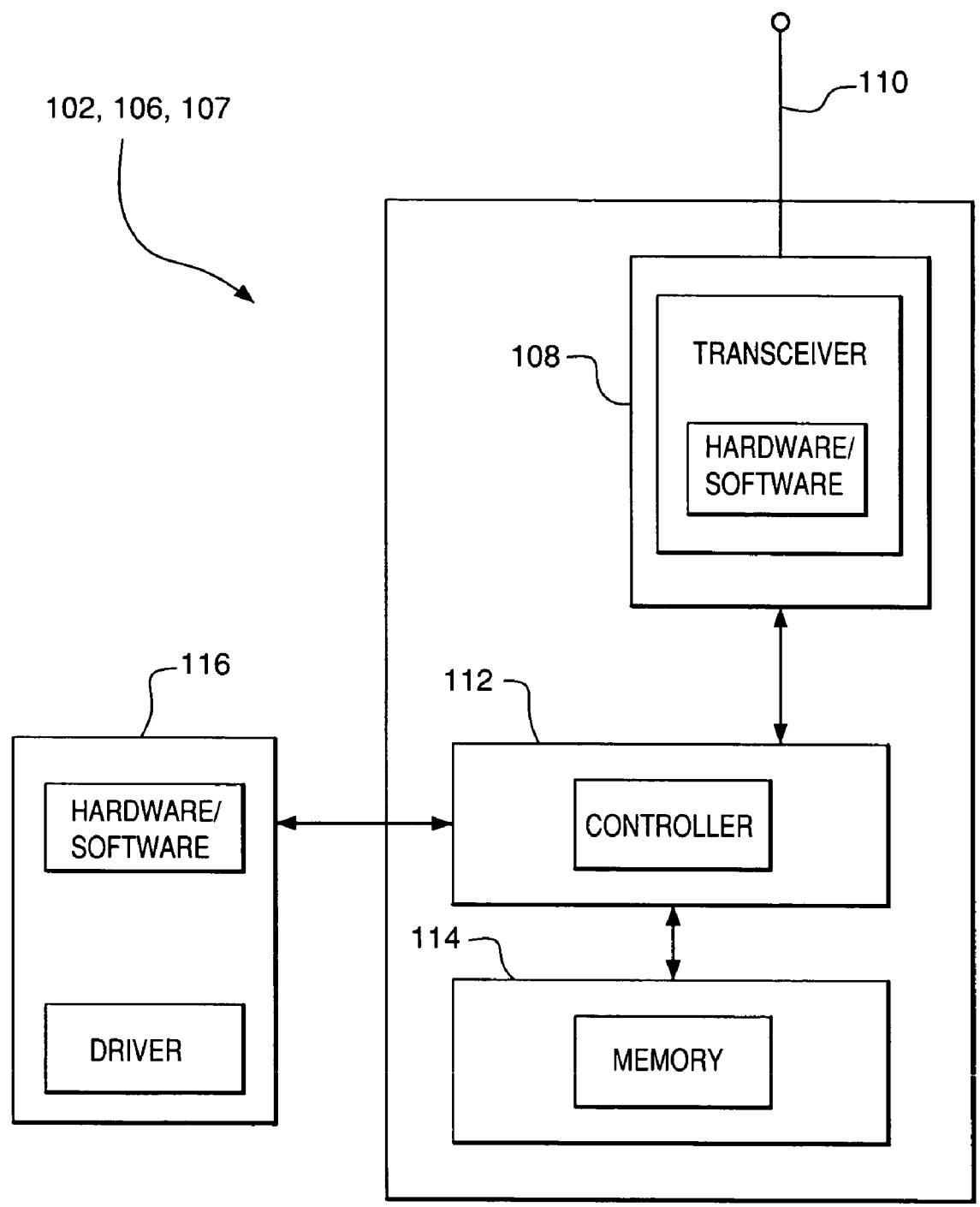
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As discussed above, the bandwidth efficient ranging system and method that will now be described in detail are applicable to wireless digital communication systems, especially to ad-hoc multihopping networks. In those networks, almost all nodes 102 are mobile, and continuously exchange information about the network structure. It assures that data packets are correctly routed across the network from the source to the destination, following a multihopping path.

The elevated mobility of network nodes 102, sometimes at highway speed, combined with the use of low energy for transmission of data messages, makes necessary the prediction of events affecting adversely the network integrity and the application of corrective actions before the network integrity is affected. The predictive control of transmit power in wireless digital ad-hoc networks using multihopping capabilities is presented in U.S. Pat. No. 6,904,021, the entire content of which is incorporated herein by reference.

For purposes of example, the description will refer to mobile nodes or terminals 102. However, the other types of nodes 106 and 107 also can perform the same operations and include the same hardware and software necessary for performing such operations. Each node or terminal 102 includes a register that is incremented periodically and is called "the terminal clock". The register can be included in the controller 112 and/or in the hardware associated with the controller 112. In the following description, the term "terminal time" or "node time" refers to the value recorded in the clock register at a particular moment. Because the clocks are not synchronized, all clock registers show different values all the time. When the clock register is full, its content returns to zero. It means that each terminal shows time zero at a periodic rate.

In accordance with an embodiment of the present invention, each node 102 transmits a digital message periodically (e.g., when the terminal clock register is zero). All neighbor nodes 102 receiving the message record the respective time of arrival (TOA), that is, each node 102 receiving the message records the content of the clock register at receiving time. Evidently, the TOA recorded by all nodes 102 receiving the same message are all different because node clocks are not synchronized. Also, because the clocks are not synchronized, it is expected that the signals from all network nodes 102 are spread across the clock interval and do not interfere.

The digital message transmitted at the beginning of the clock interval contains the identification about all neighbor nodes 102 from where messages have been received, the TOA of those messages and the position of the node transmitting the message, if the position is known. The precision of TOA is very important, and methods for improving the TOA quality are described in U.S. Patent Application Publication No. 2003/0227895 and U.S. Pat. No. 6,137,441, the entire content of both being incorporated herein by reference.

Figure 3:
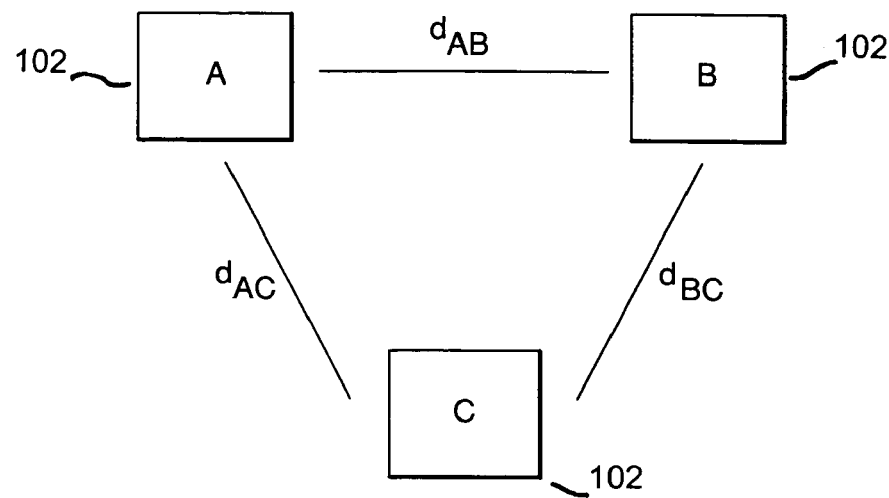
FIG. 3 is a block diagram illustrating an example of three nodes of the wireless network shown in FIG. 1 operating in accordance with an embodiment of the present invention.

After transmitting one message and receiving n−1 messages from all neighbors, a node 102 operating in the n node network can compute its own position and the positions of all other terminals in the network 100 as will now be described. For purpose of example, the technique used in accordance with an embodiment of the present invention will be described in a simplified example with three nodes (e.g., nodes 102) only as shown in FIG. 3. However, the technique is applicable to any size network as would be evident to one of ordinary skill in the art.

FIG. 3 has three nodes 102 identified as nodes A, B, and C, that transmit the ranging message every $\tau$ seconds. The respective distances between the nodes are $d_{AB}$, $d_{BC}$ and $d_{AC}$ corresponding to propagation times $p_{AB}$, $p_{BC}$ and $p_{AC}$.

When the node A clock shows $t_A$, the clocks on other two nodes show $t_B$ and $t_C$. Assuming that all of the clocks do not drift, the relative corrections of node clocks are defined by the following relationships:

$$\Delta_{BA} = t_B - t_A$$

$$\Delta_{CA} = t_C - t_A$$

$$\Delta_{AB} = t_A - t_B$$

$$\Delta_{AC} = t_A - t_C$$

$$\Delta_{BC} = t_B - t_C$$

$$\Delta_{CB} = t_C - t_B$$

These six corrections have the following properties:

$$\Delta_{BA} = \tau - \Delta_{AB}$$

$$\Delta_{CA} = \tau - \Delta_{AC}$$

Figure 4:
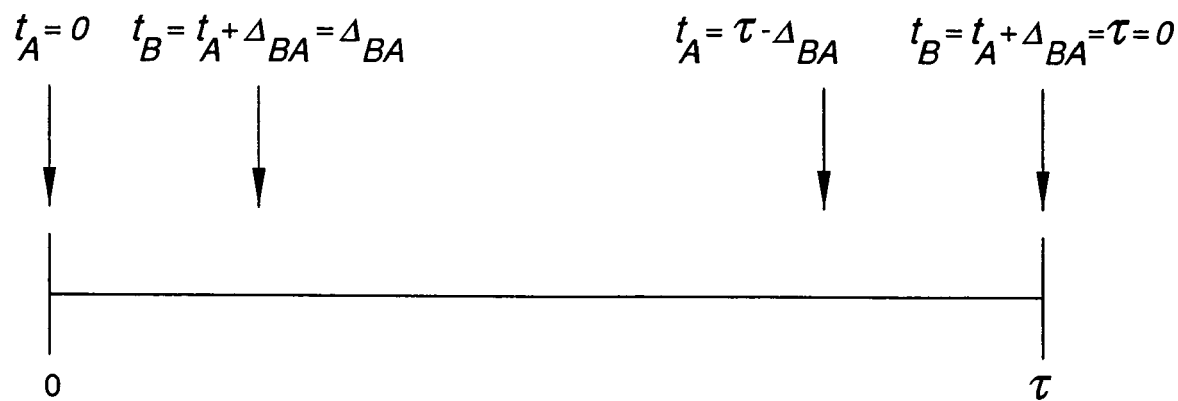
FIG. 4 is a graph illustrating an example of the relationship between clocks of the nodes shown in FIG. 3.

$\Delta_{BC} = \tau - \Delta_{CB}$ $\Delta_{AB} + \Delta_{BC} = \Delta_{AC}$ $\Delta_{BC} + \Delta_{CA} = \Delta_{BA}$ $\Delta_{CA} + \Delta_{AB} = \Delta_{CB}$ As can be appreciated from the above relationships, if properties $\Delta_{BA}$ and $\Delta_{CA}$ as selected independently, all other corrections can be computed from those two. The relationships between the clock properties is illustrated in FIG. 4.

When the clock at node A shows zero, the node transmits its message. At that moment, the clock on node B shows $\Delta_{BA}$ and the clock at node C shows $\Delta_{CA}$. When nodes B and C receive the message transmitted by A, their respective clocks show the times $\Delta_{BA} + p_{AB}$ and $\Delta_{CA} + p_{AC}$ When the clock on node B is zero, node B transmits its message. At that moment the clock at node A shows the time $\tau - \Delta_{BA}$ while the clock at node C shows the time $\Delta_{CA} + \tau - \Delta_{BA}$. The message transmitted by node B is received at node A at time $\tau - \Delta_{BA} + p_{AB}$ and at node C at time $\Delta_{CA} + \tau - \Delta_{BA} + p_{BC}$ When node C transmits its message, the clock at node A shows time $\tau - \Delta_{CA}$ and the clock at node B shows $\Delta_{BA} + \tau - \Delta_{CA}$. When the message from C is received, the clock of node A shows time $\tau - \Delta_{CA} + p_{AC}$ while the clock at node B shows $\Delta_{BA} + \tau - \Delta_{CA} + p_{BC}$.

Therefore, at the end of one cycle, node A has the following information received from messages transmitted by other nodes or measured locally:

TABLE 1

| | Node A | Node B | Node C |
|---|---|---|---|
| A | | $\eta_{AB} = \Delta_{BA} + p_{AB}$ | $\eta_{AC} = \Delta_{CA} + p_{AC}$ |
| B | $\eta_{BA} = \tau - \Delta_{BA} + p_{AB}$ | | $\eta_{BC} = \Delta_{CA} + \tau - \Delta_{BA} + p_{BC}$ |
| C | $\eta_{CA} = \tau - \Delta_{CA} + p_{AC}$ | $\eta_{CB} = \Delta_{BA} + \tau - \Delta_{CA} + p_{BC}$ | |

The six values $n_{AB}$, $n_{AC}$, $n_{BA}$, $n_{BC}$, $n_{CA}$ and $n_{CB}$ are the content of the clock registers of each node when receiving the corresponding message and are either measured by a particular (such as values $n_{BA}$ and $n_{CA}$ which are measured by node A) or received with the messages transmitted by the other nodes.

From these numbers the unknown ranges $p_{AB}$, $p_{BC}$ and PAC and the clock corrections $\Delta_{BA}$ and $\Delta_{CA}$ can be easily computed as follows:

$p_{AB} = \frac{n_{AB} + n_{BA} - \tau}{2}$ $p_{AC} = \frac{n_{AC} + n_{CA} - \tau}{2}$ $p_{BC} = \frac{n_{BC} + n_{CB} - 2\tau}{2}$ $\Delta_{AB} = \frac{n_{AB} - n_{BA} + \tau}{2}$ $\Delta_{AC} = \frac{n_{AC} - n_{CA} + \tau}{2}$ After the propagation time between all nodes has been computed, the method presented in copending U.S. patent application of John M. Belcea entitled "Autonomous Reference System and Method for Monitoring the Location and Movement of Objects", referenced above, can be used for computing the relative coordinates of each node. The method presented in U.S. Pat. No. 6,728,545, incorporated by reference herein, can also be used for computing the geocentric and geographic coordinates. The difference of propagation times can also be used with the well known method of intersection of hyperbolas for computing the geocentric and geographic coordinates.

In actual practice, certain conditions can affect the ranging measurements. For example, the oscillators of each node 102, which provide the clock tick, do not have exactly the same frequency on all nodes 102. This means that if the clock cycle $\tau$ is too large, the measured TOA could be affected by errors. The most common oscillator has a frequency error of 2 ppm, which means that the node clock could slip 2 μs every second. In order to measure the range with an error smaller than 1 meter, the clock drift error should be smaller than 3 ns. The result is that, for assuring an error smaller than 3 ns caused by a 2 ppm oscillator, the clock cycle must be not larger than 3 ms. Each node in the network therefore has to transmit one message during each clock cycle. Depending upon the burst throughput of each node, the condition could be difficult to achieve if the number of nodes is too large.

The TOA of a message is identified by correlating a sequence of pseudorandom bits. In Quadrature Phase Shift Keying (QPSK) modulation, two pseudorandom sequences can be used simultaneously for increasing the precision of TOA measurement. In addition, specific methods can use the variation of the correlation function for improving the precision of TOA measurement. An example of such method is presented in United States Patent Application Publication No. 20030227895 entitled "System and method for improving the accuracy of time of arrival measurements in a wireless ad-hoc communications network", the entire content of which is incorporated herein by reference.

Further improvements of the precision of TOA can be achieved by correcting the measured values with the effect of the clock drift. Such effect can be evaluated by identifying the changes of carrier signal phase. The phase shift of the received carrier signal is measured before and after receiving the pseudorandom sequence for identifying the drift of the oscillator clock of the node receiving the signal in relation with the frequency of the received signal.

When a node transmits the message with the TOA of messages received from neighbors, it also transmits that information about the relative drift of its own clock in reference with all neighbor clocks. The node performing the computation of the location applies the drift correction according with clock corrections as presented in Table 2. In this table $\delta_{AB}$ is the drift of clock B in relation with clock A, $\delta_{BA}$ is the drift of clock A in relation with clock B, and so on.

TABLE 2

| Event | Node A | Node B | Node C |
|---|---|---|---|
| A | | $\eta_{AB} = \Delta_{BA} + p_{AB}$ $(1 + \delta_{AB})$ | $\eta_{AC} = \Delta_{CA} +$ $p_{AC} (1 + \delta_{AC})$ |
| B | $\eta_{BA} = p_{AB} +$ $(\tau - \Delta_{BA})$ $(1 + \delta_{BA})$ | | $\eta_{BC} = p_{BC} (1 +$ $\delta_{AC}) +$ $\Delta_{CA} + (\tau - \Delta_{BA})$ $(1 + \delta_{CB})$ |
| C | $\eta_{CA} = p_{AC} +$ $(\tau - \Delta_{CA})$ $(1 + \delta_{CA})$ | $\eta_{CB} = p_{BC} (1 + \delta_{AB}) +$ $(\tau - (\Delta_{CA} + (\tau - \Delta_{BA})$ $(1 + \delta_{BC})))(1 + \delta_{CB})$ | |

In a network with three nodes, three events are occurring: transmission from A, transmission from B, and transmission from C. Each transmission is executed when the clock register of the node performing the transmission is equal to zero. Since the clock period is $\tau$, the transmission happens when the clock register value is $\tau$.

| First Event | Node A | Node B | Node C |
|---|---|---|---|
| | 0 | $\Delta_{BA}$ | $\Delta_{CA}$ |

When A transmits, the clock at node A is zero, while the clocks at nodes B and C show $\Delta_{BA}$ and $\Delta_{BA}$.

| Second Event | Node A | Node B | Node C |
|---|---|---|---|
| | $(\tau - \Delta_{BA})(1 + \delta_{BA})$ | 0 or $\tau$ | $\Delta_{CA} + (\tau - \Delta_{BA})(1 + \delta_{BC})$ |

The second event happens $\tau-\Delta_{BA}$ seconds after the first event. The time is measured by the clock on node B, which controls the event execution. Because the clock on node A runs faster (or slower) than the clock on node B, when the second event happens, the clock on node A shows the time $(\tau-\Delta_{BA})(1+\delta_{BA})$ In similar mode, the clock on node C advances between the two events with $(\tau-_{BA})(1+\tau_{BC})$.

| Third Event | Node A | Node B | Node C |
|---|---|---|---|
| | $(\tau - \Delta_{CA})(1 + \delta_{CA})$ | $(\tau - (\Delta_{CA} + (\tau - \Delta_{BA})(1 + \delta_{BC})))(1 + \delta_{CB})$ | 0 or $\tau$ |

The third event happens $\tau-\Delta_{CA}$ seconds after the first event or $\tau-(\Delta_{CA}+(\tau-\Delta_{BA})(1+\delta_{BC}))$ seconds after the second event. These time intervals are measured by the clock running on node C that controls the transmission. As indicted above, the clock on node A shows $(\tau-\Delta_{CA})(1+\delta_{CA})$ while the clock on node B shows $(\tau-(\Delta_{CA}+(\tau-\Delta_{BA})(1+\delta_{BC})))(1+\delta_{CB})$ Distances between these three nodes A, B and C are $d_{AB}$, $d_{AC}$, and $d_{BC}$. The propagation time is the time the signal travels from one node to the next. The propagation time is measured with clocks running on each node. Since these clocks do not have the same pace, it is expected that each clock provides a measurement different than the other two.

Because the computation is performed at node A, the node A clock is considered the reference for notation purposes, meaning that the propagation time measured by clock A as $p_{AB}$ is measured by the clock B as $p_{AB}(1+\delta_{AB})$. The propagation times of signals received at A are correct because they are timed with the "correct clock," but all other propagation times have to be corrected.

The result is that the starting time of the event needs correction with the drift between the clock controlling the event and the clock receiving the signal, while the propagation time should be corrected with the drift between the node receiving the signal and the node A that is performing the computation. The values $n_{AB}$, $n_{AC}$, $n_{BA}$ and so on are the TOA measured by each node, so they are known numbers. The $\delta_{AB}$, $\delta_{AC}$, $\delta_{BC}$ and so on are also measured by each node when the message is received. The only unknown variables are the propagation times $p_{AB}$, $p_{BC}$ and PAC and the clock shifts $\Delta_{BA}$ and $\Delta_{CA}$. They can be easily computed from the linear equations from Table 2.

It is also noted that the values $\Delta_{BA}$ and $\Delta_{CA}$ are the clock shifts when the transmission from A happened (at time zero for node A). Because these clocks have different paces, the clock shift between any two nodes changes continuously. Therefore, these equations provide the values of the unknown variables at time zero not at the time when data was collected. The technique thus allows for precise computation of clock shifts and propagation times regardless of the length of the clock cycle $\tau$ and the precision of oscillators controlling the clock ticks and the transmit frequency.

As stated above, for purposes of this discussion, the clock at node A has been considered as a reference. Any node in the network can perform the same computation by considering itself as a reference (or as node A). The drift of the reference node in relation with the standard second has an effect of incorrect computation of the distance associated with the propagation time of the radio signal. For a 1 ppm frequency error, the expected error is about $10^{-6}$ m per meter, or 0.001 m per km.

The relative speed of the nodes 102 is identified by each node via the drift of clock frequencies. When the nodes are moving apart, each node 102 sees the other node clock running slower than it really does. When the nodes 102 are approaching each other, each node 102 sees the other one running at a higher frequency than it really does.

As discussed above, these techniques can be used in wireless digital networks with or without multi-hopping capabilities. When the techniques are used to provide geographic coordinates, multihopping capabilities are generally needed for transmitting the geographical coordinates of fixed references. Also, similar results can be obtained while using beacon identifiable signals instead of digital messages for collecting the TOA or range information.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for determining distances between nodes in a wireless communication network, comprising:

operating a plurality of nodes in the wireless communication network to periodically transmit respective messages, each of the nodes including a clock which is unsynchronized with the clocks of the other nodes, and each respective message transmitted by a respective node contains respective information pertaining to neighboring nodes of that respective node from which any previous messages have been received by that respective node; and operating at least one of the nodes in the wireless communication network to receive the messages from its respective neighboring nodes, to record the respective times of arrival of the respective received messages, and to determine respective distances between itself and the respective neighboring nodes based on the respective times of arrival of the respective received messages and the respective information in the respective received messages.

2. The method as claimed in claim 1, wherein the step of operating at least one of the nodes comprises:
operating that node to identify respective differences between its clock frequency and respective information pertaining to frequencies of the clocks of the other nodes included in the respective received messages, and to adjust the respective times of arrival based on the respective differences;
operating that node to transmit information related to drift of its clock relative to all neighboring clocks in the respective messages; and
operating that node to determine the respective distances between itself and the respective neighboring nodes based on the adjusted respective times of arrival of the respective received messages and the respective information in the respective received messages.

3. The method as claimed in claim 2, wherein:
the information in a said message comprises information pertaining to respective times of arrival of the previous messages received by the node transmitting that said message.

4. The method as claimed in claim 1, wherein the step of operating at least one of the nodes comprises:
operating that node to determine respective time of flight values for the respective received messages to travel from their respective transmitting neighboring nodes to that node based on the respective times of arrival of the respective received messages and the respective information in the respective received messages; and
operating that node to determine the respective distances between itself and the respective neighboring nodes based on the respective time of flight values.

5. The method as claimed in claim 1, wherein:
the information in a said message comprises information pertaining to respective locations of the neighboring nodes that transmitted the previous messages received by the node transmitting that said message.

6. The method as claimed in claim 1, wherein:
the step of operating the node comprises operating the node to perform one-way ranging to determine the respective distances between itself and the respective neighboring nodes such that the node receives the respective messages from its respective neighboring nodes without first requesting the respective messages from its respective neighboring nodes.

7. The method as claimed in claim 1, wherein:
the wireless communication network comprises a multi-hopping wireless network, and the operating steps are performed on the nodes communicating in the multi-hopping wireless network.

8. The method as claimed in claim 1, wherein the step of operating the plurality of nodes comprises operating the plurality of nodes in the wireless communication network to periodically transmit respective messages when a terminal clock register is zero.

9. A wireless communication network, comprising:
a plurality of nodes, each comprising a clock which is unsynchronized with the clocks of the other nodes, and each being adapted to periodically transmit a respective message, each respective message transmitted by a respective node contains respective information pertaining to neighboring nodes of that respective node from which any previous messages have been received by that respective node; and
at least one of the nodes is adapted to receive the messages from its respective neighboring nodes, to record the respective times of arrival of the respective received messages, and to determine respective distances between itself and the respective neighboring nodes based on the respective times of arrival of the respective received messages and the respective information in the respective received messages.

10. The wireless communication network as claimed in claim 9, wherein:
said at least one node is further adapted to identify respective differences between its clock frequency and respective information pertaining to frequencies of the clocks of the other nodes included in the respective received messages, to adjust the respective times of arrival based on the respective differences, and to determine the respective distances between itself and the respective neighboring nodes based on the adjusted respective times of arrival of the respective received messages and the respective information in the respective received messages.

11. The wireless communication network as claimed in claim 9, wherein:
said at least one node is further adapted to determine respective time of flight values for the respective received messages to travel from their respective transmitting neighboring nodes to that node based on the respective times of arrival of the respective received messages and the respective information in the respective received messages, and to determine the respective distances between itself and the respective neighboring nodes based on the respective time of flight values.

12. The wireless communication network as claimed in claim 9, wherein:
the information in a said message comprises information pertaining to respective times of arrival of the previous messages received by the node transmitting that said message.

13. The wireless communication network as claimed in claim 9, wherein:
the information in a said message comprises information pertaining to respective locations of the neighboring nodes that transmitted the previous messages received by the node transmitting that said message.

14. The wireless communication network as claimed in claim 9, wherein:
said at least one node is further adapted to perform one-way ranging to determine the respective distances between itself and the respective neighboring nodes such that the node is adapted to receive the respective messages from its respective neighboring nodes without first requesting the respective messages from its respective neighboring nodes.

15. The wireless communication network as claimed in claim 9, wherein:
the wireless communication network comprises a multi-hopping wireless network, and the nodes are adapted to communicate in the multihopping wireless network.

16. A node, adapted to communicate in a wireless communication network, the node comprising:
a clock which is unsynchronized with clocks of other nodes in the wireless communication network;
a transceiver, adapted to periodically transmit a respective message, each respective message containing respective information pertaining to neighboring nodes of the node from which any previous messages have been received by the node, and further adapted to receive messages from its respective neighboring nodes; and a controller, adapted to record the respective times of arrival of the respective received messages, and to determine respective distances between itself and the respective neighboring nodes based on the respective times of arrival of the respective received messages and the respective information in the respective received messages.

17. The node as claimed in claim 16, wherein:

the controller is further adapted to identify respective differences between a frequency of the clock of the node and respective information pertaining to frequencies of the clocks of the other nodes included in the respective received messages, to adjust the respective times of arrival based on the respective differences, and to determine the respective distances between the node and the respective neighboring nodes based on the adjusted respective times of arrival of the respective received messages and the respective information in the respective received messages.

18. The node as claimed in claim 16, wherein:

the controller is further adapted to determine respective time of flight values for the respective received messages to travel from their respective transmitting neighboring nodes to the node based on the respective times of arrival of the respective received messages and the respective information in the respective received messages, and to determine the respective distances between the node and the respective neighboring nodes based on the respective time of flight values.

19. The node as claimed in claim 16, wherein:

the information in a said message comprises information pertaining to respective times of arrival of the previous messages received by the node transmitting that said message.

20. The node as claimed in claim 16, wherein:

the information in a said message comprises information pertaining to respective locations of the neighboring nodes that transmitted the previous messages received by the node transmitting that said message.

21. The node as claimed in claim 16, wherein:

the controller is adapted to control the node to perform one-way ranging to determine the respective distances between the node and the respective neighboring nodes by controlling the transceiver to receive the respective messages from the respective neighboring nodes without first transmitting a request for the respective messages to the respective neighboring nodes.

* * * * *